United States Patent [19]
Lenke et al.

[11] Patent Number: 5,223,584
[45] Date of Patent: * Jun. 29, 1993

[54] IN SITU THERMOSET MOLECULAR COMPOSITES

[75] Inventors: Gerd M. Lenke, Canton; Donald R. Wiff, Akron, both of Ohio

[73] Assignee: GenCorp Inc., Fairlawn, Ohio

[*] Notice: The portion of the term of this patent subsequent to Nov. 26, 2008 has been disclaimed.

[21] Appl. No.: 807,120

[22] Filed: Dec. 13, 1991

Related U.S. Application Data

[60] Continuation-in-part of Ser. No. 783,460, Oct. 28, 1991, which is a division of Ser. No. 377,987, Jul. 11, 1989, Pat. No. 5,068,292.

[51] Int. Cl.$^5$ .............................................. C08G 59/00
[52] U.S. Cl. .................................. 525/405; 525/452; 525/528; 525/533; 525/534
[58] Field of Search ............... 525/509, 423, 510, 405, 525/408, 409, 452, 528, 533–535, 540

[56] References Cited

U.S. PATENT DOCUMENTS

| | | | |
|---|---|---|---|
| 3,372,132 | 3/1968 | Cruz, Jr. ............................. | 527/312 |
| 4,207,407 | 6/1980 | Helminiak et al. ................. | 525/425 |
| 4,228,218 | 10/1980 | Takayanagi et al. ................ | 525/58 |
| 4,377,546 | 3/1983 | Helminiak et al. ................. | 264/232 |
| 4,412,148 | 10/1983 | Klicker et al. ...................... | 310/358 |
| 4,414,362 | 11/1983 | Lenke et al. ........................ | 525/178 |
| 4,448,956 | 5/1984 | Lenke et al. ........................ | 528/312 |
| 5,068,292 | 11/1991 | Lenke et al. ........................ | 525/509 |

FOREIGN PATENT DOCUMENTS 2008598 6/1979 United Kingdom .

OTHER PUBLICATIONS

"Polymer Composites of Rigid and Flexible Molecules: System of Wholly Aromatic and Aliphatic Polyamides," J. Macromol. Sci.-Phys., B17(4), 591 (1980).
"Composites on a Molecular Level: Phase Relationships, Processing, and Properties," J. Macromol. Sci.--Phys., B22(2), 231 (1983).

*Primary Examiner*—John C. Bleutge
*Assistant Examiner*—D. Aylward

[57] ABSTRACT

The present invention provides a composite material comprised of a matrix polymer and a reinforcing polymer, called a rigid rod polymer, which is well dispersed in the matrix polymer. This material displays enhanced mechanical properties. The matrix polymer is preferably cured resin, preferably epoxy resin. The rigid rod polymer may be made from polyazomethines, polyimides or polycarbodimides, or mixtures thereof. Preferably, the reinforcing polymer is a polyazomethine. The invention also relates to a method for making the composite material. The composite material is preferably made by first dissolving the rigid rod polymer precursors in the matrix polymer precursors, then polymerizing the rigid rod polymer precursors in-situ and then polymerizing the matrix polymer precursors, in-situ. Alternatively, the rigid rod polymer precursors may be polymerized in-situ simultaneously with the polymerization of the matrix polymer precursors.

24 Claims, No Drawings

IN SITU THERMOSET MOLECULAR COMPOSITES

CROSS REFERENCE TO RELATED APPLICATIONS

This application is a continuation-in-part of U.S. patent application Ser. No. 07/783,460, filed Oct. 28, 1991; which is a divisional of U.S. patent application Ser. No. 07/377,987, filed Jul. 11, 1989, now U.S. Pat. No. 5,068,292.

BACKGROUND OF THE INVENTION

Plastics, due to their desirable properties have been the focus of continuous research to expand their uses and further enhance their properties. Attempts have been made to create stronger plastic materials by adding fibers, such as fiberglass to the plastic. While such fibers provide reinforcement, a significant amount of fiber, a minimum of 30% by weight, is necessary to provide the desired reinforcement and other mechanical properties. Also, the length of the fiber must be greater than 1 cm.; this creates processing limitations. The drawbacks of fiber reinforcement of plastics led to the use of smaller reinforcing agents in plastic. One such use was to add a finely pulverized polymer, poly-p-phenylene terephthalamide to thermoplastics polymer nylon 66. The polymers were physically melted and mixed while in the liquid state. However, the process was limited by the inability to achieve dispersion of the reinforcing polymer, that is, the poly-p-phenylene terephthalamide. Attempts have been made to co-dissolve the reinforcing polymer with the matrix polymer; and then to remove the solvent. However, this method has a significant drawback because the only solvents which dissolve both the reinforcing polymer and the matrix polymer are very strong acids.

An attempt was made to dissolve a high molecular weight liquid crystalline reinforcing polymer into non-polymerized precursors for a matrix polymer. The matrix precursors were then polymerized; the product was a polymeric liquid crystalline reinforced isotropic blend. Again, such a method is limited by the solubility of the reinforcing polymer in the matrix polymer precursor; this resulted in limited dispersion of the reinforcing polymer.

It would be desirable to have a composite material, a matrix polymer and a reinforcing polymer in which the reinforcing polymer is well dispersed in the matrix polymer thus forming a composite which displays enhanced mechanical properties.

SUMMARY OF THE INVENTION

The present invention provides a composite material comprised of a matrix polymer and a reinforcing polymer in which the reinforcing polymer, referred to herein as a "rigid rod polymer," is well dispersed in the matrix polymer. This material displays enhanced mechanical properties, such as improved flexural, tensile and compression properties. The invention also relates to a method for making the composite material.

The matrix polymer may be cured resins, preferably epoxy resins. The rigid rod polymer may be polyazomethines, polyimides or polycarbodimides, or mixtures thereof. Preferably the reinforcing polymer is a polyazomethine, "PAM." The composite material may be made by dissolving the rigid rod polymer precursors in the matrix polymer precursors, then polymerizing the rigid rod polymer precursors in-situ followed by the polymerization of the matrix polymer precursors in-situ. Alternatively, depending on the type of rigid rod precursors and/or the type of matrix polymer precursors, utilized, the rigid rod polymer precursors may be polymerized simultaneously with the polymerization of the matrix polymer precursors; both polymerizations are performed in-situ.

DESCRIPTION OF THE DRAWINGS

FIG. 1 is a dynamic-mechanical-thermal analysis of three composites comprised of PAM/Epon 828/PMDA in a ratio of 15.4/63.4/21.2; PAM/Epon 828/PMDA in a ratio of 12/65/23, PAM/Epon 828/PMDA in a ratio of 7.6/68.5/23.8; where E' = the storage modulus.

FIG. 2 is a differential scanning calorimetry of a composite comprised of PAM/Epon 828 in a ratio of 20/80, containing no additional curative.

DETAILED DESCRIPTION OF THE INVENTION

The present invention provides a composite material comprised of a matrix polymer and a rigid rod polymer in which the rigid rod polymer is well dispersed in the matrix polymer. By rigid rod polymer it is meant: any polymer which is intrinsically rigid, that is, in dilute solution, the ratio of its mean end-to-end distance to its constant length is almost one. Other parameters are that the "Mark-Houwink" exponent must be close to 2.0, that is from 1.8 to 2.0 and the persistence length is almost equal to the contour length of the polymer chain. This material displays enhanced mechanical properties such as improved flexural and tensile properties. The invention also relates to a method for making the composite material.

The matrix polymer may be made from cured resins, preferably epoxy resins. Typically, the matrix polymer is the polymer which preferably is present in a proportionately greater amount than the reinforcing polymer. The matrix polymer is thermosetting. The matrix polymer is present in the composite in an amount from about 40% to about 99% by weight. Conversely, the rigid rod polymer is present in an amount from about 1% to about 60% by weight. The rigid rod polymer may be polyazomethine, polyimide or polycarbodimide, or mixtures thereof. Preferably the rigid rod polymer is polyazomethine. Preferably, the precursors to the polyazomethine are p-phenylene diamine and terephthalaldehyde. Depending on the amount of precursors, very little or no curing agent is required if the precursors to the polyazomethine are p-phenylene diamine and terephthalaldehyde and the matrix polymer precursor is epoxy resin. Typically, varying amounts of curing agents, and/or catalysts, and/or accelerators may be required; conventional curing agents and/or catalysts and/or accelerators may be used.

The composite material may be made by first dissolving the rigid rod polymer precursors in the matrix polymer precursors. Then the rigid rod polymer precursors are polymerized. Thereafter, the matrix polymer precursors are polymerized. Alternatively, depending on the type of rigid rod precursors and/or the type of matrix polymer precursors utilized, the rigid rod polymer precursors may be polymerized simultaneously with the polymerization of the matrix polymer precursors.

Rigid Rod Polymers

The purpose of the rigid rod polymers is to provide the resulting product, that is, the composite material, with increased tensile modulus, tensile strength, stiffness, flexural modulus, and flexural strength. Rigid rod polymers may be polyazomethines, polyimides, polycarbodiimides, or mixtures thereof. The selection of the rigid rod polymer depends on several factors, the desired end properties of the composite as well as the solubility of the rigid rod polymer precursors in the matrix polymer precursors. Furthermore, there should be only limited reaction between the rigid rod polymer precursor and the matrix polymer precursor in the temperature range within which the reaction occurs between the rigid rod polymer precursors. Generally, it is desirable that there be some limited reaction between the end groups of the rigid rod polymers and a reactive site of the matrix polymer precursor; this interaction may result in the grafting of a matrix polymer precursor onto the resulting rigid rod polymer backbone. Such grafting should enhance the molecular dispersion of the resulting rigid rod polymers within the matrix polymer.

The rigid rod polymer may be present from about 1% up to about 60% of the combined rigid rod polymer-matrix polymer weight; preferably from about 5% to about 30% of the combined weight.

Polyazomethine Precursors

Polyazomethine rigid rod polymers are formed from the reaction between rigid rod precursors such as diamines and dialdehydes. Not all polyazomethines form rigid rod polymers.

a. Diamines

The diamines must be primary amines, preferably aromatic p-diamines, such as para-phenylene diamine "p-PDA," 2,5-dichloro-1-4-phenylene-diamine, alkyl substituted phenylene diamines, such as, for example, 2-methyl-1,4-phenylene diamine, 2,5-dimethyl-1,4-phenylene diamine, and 2,3,5,6-tetramethyl-1,4-phenylene diamine, benzidine, and the derivatives of benzidine, such as for example, 3,3'-dichloro-benzidine, 3,3'-dimethyl-benzidine, and 3,3' dihydroxy-benzidine, and o-toludine sulfone. The paraphenylene diamine "p-PDA", is usually preferred.

In addition, small amounts of other amines may be used; for example, to synthesize star type rods, small amounts of tetra-functional or tri-functional amines may be used, for example tetraamine biphenyl which is represented by the following structure:

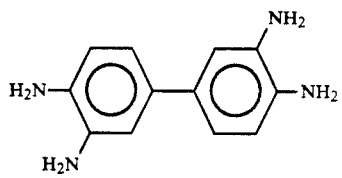

The tetraamine biphenyl is typically added in an amount from about 0.5% to about 5% of the total amine weight. The tetraamine biphenyl is added to the matrix polymer precursor, to which has been added the dialdehyde rigid rod polymer precursor; however, the diamine rigid rod precursor is not initially present. After the tetraamine biphenyl has reacted with the dialdehyde, the diamine rigid rod polymer precursor is added.

Many of the above mentioned amino compounds are commercially available (although not all in bulk quantities). Also many other suitable diamines may be synthesized for the use as rigid rod precursors.

Optionally, aromatic diamines with amino groups in the "non-para" positions, for example, the "meta" positions, or aromatic diamines with linking groups such as: methylene, oxygen, sulfur, $SO_2$, and carbonyl, that do not yield straight, rigid polymers, may also be used. These aromatic diamines are advantageous, because, depending on the aromatic diamine, they may be more soluble in the matrix polymer precursors, and they are typically less expensive than the para-linked aromatic diamines. However, the use of these aromatic diamines as rigid rod polymer precursors will yield a rigid rod polymer that is less rigid. These optional aromatic diamines are added in minor concentrations, for example, less than 10 mole % of the total diamine concentration. Examples of such aromatic diamines are: m-phenylene diamine, 4,4'-diaminophenyleneoxide, methylene-4,4'-dianiline, isoproplydiphenylene-4-4'-diamine, biphenylene-bis(oxyaniline). A suitable biphenylene-bis-(oxyaniline) is represented by the following structure:

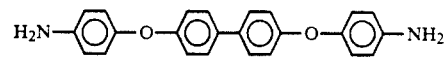

Monoamines, such as aniline or its derivatives may be added in small amounts as chain terminators for the rigid rod polymers.

b. Dialdehydes

Of the dialdehyde precursors, terephthalaldehyde is preferred. Suitable dialdehyde structures are quite similar to those shown for the diamines, except that aldehyde groups have replaced the amino groups, for example, 2-methylterephthalaldehyde, 4,4'-biphenylene dialdehyde, 2,5-dichloroterephthal aldehyde. For both types of monomers, the aldehyde monomers and the amine monomers, structures having para-linked phenyl rings and para-linked amino and aldehyde groups, are preferred. Although not commercially available, other suitable dialdehydes having para-linked phenyl rings may be represented by the following general structure:

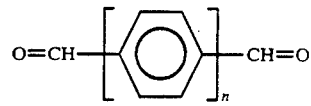

Wherein n is an integer from 2 to 6.

However, there may be limitations, as to the use of such dialdehydes due to limited solubility in a given matrix precursor.

Mono-aldehydes, including, for example, benzaldehyde or its derivatives, may be added in small amounts as chain terminators for the rigid rod polymers. Functional substituents, such as a COOH group, may be useful to attach polyazomethine to epoxy structures, and therefore the presence of such groups on the rigid rod polymer precursors is desirable.

Since the reaction between the aldehyde and primary amino groups occurs at or below room temperature, at high rates, p-phenylene diamine and tereththalaldehyde were selected as rigid rod polymer precursors to yield an all aromatic para-linked polyazomethine. The reaction of the p-phenylene diamine and terephthaladehyde is given below.

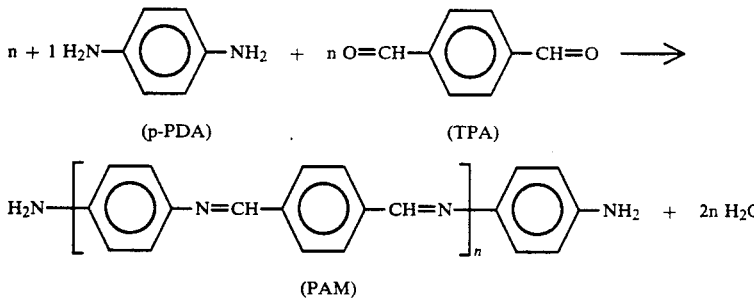

A slight stoichiometric excess of the diamine over the dialdehyde is generally preferred. The solubility of the p-phenylene diamine monomer and the terephthaldehyde monomer is satisfactory, for example, about 30 parts TPA in 100 parts of Epon 828, at approximately 60° C. In typical liquid epoxy resins such as Epon-828 or Epon-825, terephthalaldehyde is basically inert towards epoxy groups, while p-PDA is not. However, the epoxy-amine reaction rates are very slow at temperatures below 60° C. as compared to the reaction rate of the carbonyl-amine reaction, which leads to the formation of polyazomethine. Preferably, the diamine is added to a solution of the dialdehyde in the liquid matrix polymer precursors.

Polyimide Precursors

Polyimides, such as aromatic, para-linked polyimides may be synthesized in-situ, from dianhydrides, or the esters of dianhydrides and aromatic, para-linked diamines. The dianhydrides include, for example, pyromellitic dianhydride, "PMDA," naphthalene dianhydrides such as 1,4,5,6-naphthalene tetracarboxylic dianhydride and 2,3,6,7-naphthalene tetracarboxylic dianhydride, and substituted dianhydrides, having a phenyl, aliphatic group having from 1 to 6 carbon atoms, chloro, fluoro, trimethylfluoro group or a combination of such groups. Also, the tetra-esters, tri-esters or di-esters of the dianhydride may be used. By the term ester of the anhydride we mean the ester or half-ester of the acid from which the anhydride is derived. Also, diisocyanates may be used, such as p-phenylene diisocyanate and 4,4'-biphenylene diisocyanate. Again, as with the dianhydrides, both the esters and the diisocyanates may be substituted with phenyl, an aliphatic group having from 1 to 10 carbon atoms, chloro, fluoro, or trimethylfluoro group, or a combination thereof.

The diamines include for example, all aromatic, para-linked diamines, for example, p-phenylene diamine, benzidine, which may be substituted with phenyl, an aliphatic group having from 1 to 10 carbon atoms chloro, fluoro, or trimethylfluoro group, or a combination thereof.

A typical reaction showing the formation of the polyamide rigid rod polymer from the dianhydride, PMDA with an aromatic para-linked diamine, specifically p-phenylene diamine, is shown below:

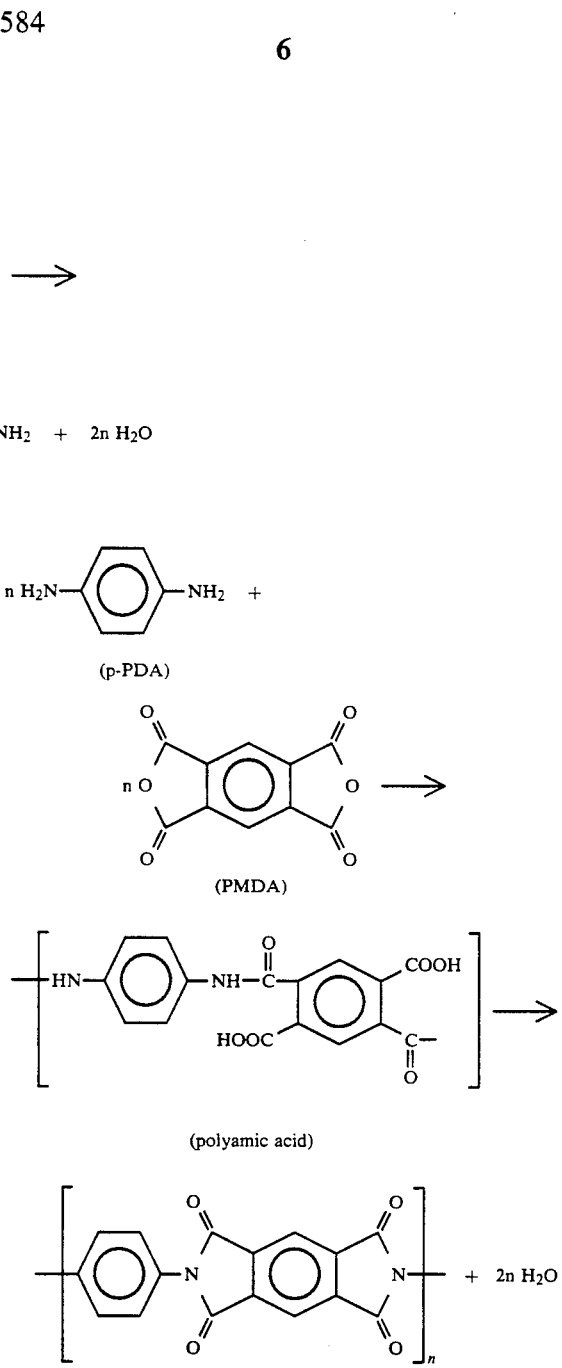

Polyamic acids, such as the polyamic acid shown above, may also be converted to poly-isoimide, for example via a reaction with carbodiimides:

polyamic acid + 2nR$_1$N=C=NR$_2$ ⟶

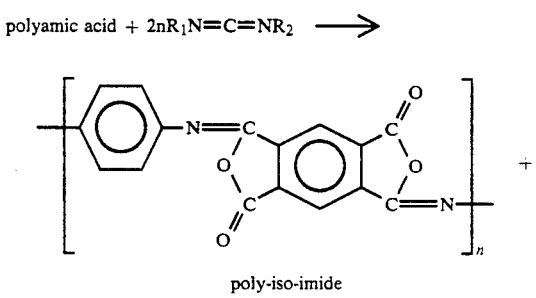

$$2nR_1NH-\overset{\overset{O}{\|}}{C}-NHR_2$$

Wherein in R1 and R2 are aliphatic groups having from one to twelve carbon atoms, cycloaliphatic groups or phenyl groups, or combinations thereof.

The poly-iso-imide may subsequently be converted to a polyamic ester or polyamic amide via a reaction with alcohols, phenols or secondary amino-compounds respectively. Upon heating, such esters or amides may then convert to polyimides, splitting out the original alcohols, phenols or secondary amines. These elimination products, in turn, may by themselves or in combination with matrix polymer precursors, form a matrix polymer through the polymerization of functional groups that may be connected to these elimination products that is the alcohols, phenols or secondary amines. Examples of such functional groups that may be present on the elimination products are: acetylenes, cyclobutenes, vinyls, allylethers and maleimides.

Polycarbodimide Precursors

Rigid rod polymers may also be polycarbodimides. Polycarbodimides may be formed from diisocyanate precursors. A variety of diisocyanates are suitable precursors, for example: 1,4-phenylene diisocyanate, 3,3'-dimethyl-biphenyl-4,4'-diisocyanate, 2-methyl-1,4-phenylene-diisocyanate and 2,3,5,6-tetramethyl-1,4-diisocyanate. Typically, diisocyanates have the general structure:

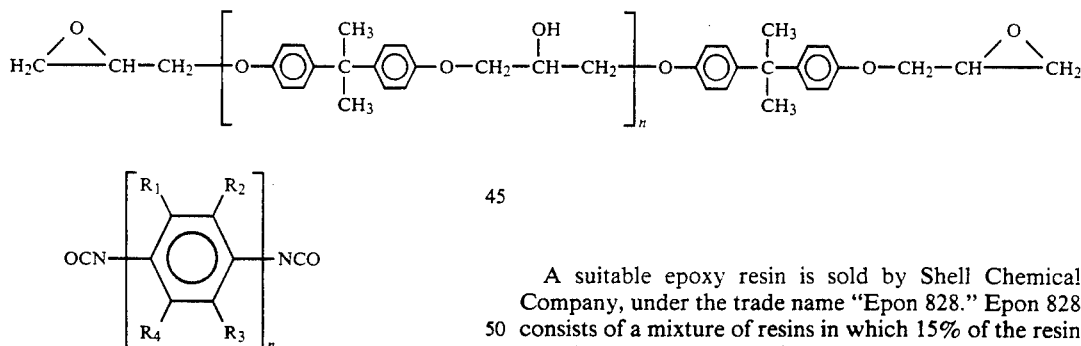

Wherein R$_1$ to R$_4$ are aliphatic groups atoms, hydrogen, alkyls, phenyl, substituted phenyls, chlorine, fluorine or trifluoromethyl, or a combination thereof.

Polycarbodiimides may be formed as shown in the following example:

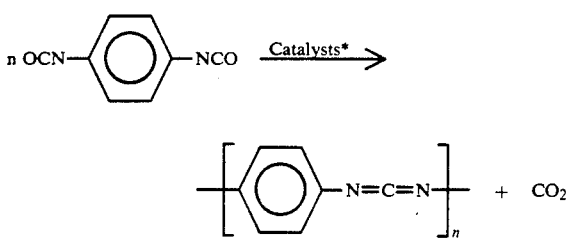

Typically, the catalysts are disubstituted phospholeneoxides and have the following structure:

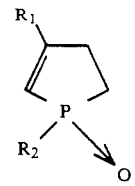

Wherein, for example, R$_1$ is a methyl group, and R$_2$ is a phenyl group.

The procedures for making polycarbodimides are disclosed in J. J. Monagle, et al., J. Acs. 84, 4288 (1962) and L. M. Alberino, et al., J. Appl. Polym. SCI, 21, 1999 (1977), which are incorporated herein.

Matrix Polymer Precursors

A variety of resins are suitable as matrix polymer precursors, however the resin must be liquid below 120° C. Also, the resin must be capable of dissolving the precursors to the rigid rod polymer. The matrix polymer precursors are present from about 40% to about 99% by weight of the combined weight of the rigid rod polymer precursors and the precursors to the matrix polymer precursors. Of the thermosetting resins the following may be used: epoxy resins; vinyl ester resins and vinyl epoxy resins; vinyl compounds; unsaturated polyester resins; unsaturated vinyl monomers; and diallyls or polyallyls or mixtures thereof. Epoxy resins, are preferred, particularly those having two or three oxirane groups per average molecule. Examples of such epoxy resin structures are:

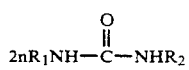

A suitable epoxy resin is sold by Shell Chemical Company, under the trade name "Epon 828." Epon 828 consists of a mixture of resins in which 15% of the resin may be represented by the above structure in which n=1, and 85% of the resin may be represented by the above structure in which n=0. Other suitable epoxy resins similar to Epon 828, are Epon 825, Epon i00i, and Epon 1009. The value for n, in the above structure varies among these Epon products; indeed the Epon resins often consist of mixtures of epoxy resins having a range for the value of n.

In addition, low viscosity di-epoxy and mono-epoxy compounds may be added as diluents; the addition of mono-epoxy diluents results in a composite with a less cross-linked matrix polymer. Poly-epoxy compounds, those having four or more oxirane groups, may be added as modifiers. These modifiers may be added to the matrix polymer, such as the Epon 828, to increase the cross-link density of the matrix polymer.

Epoxy resins of the novolac type may also be used. The general structure is given below:

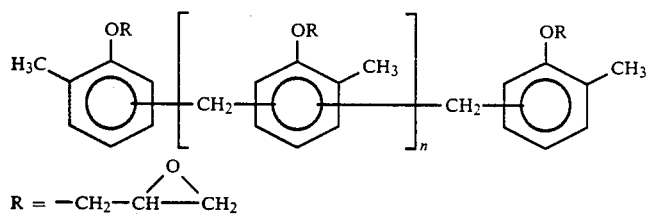

R = —CH₂—CH(—O—)CH₂

A suitable epoxy novolac resin is Epon DPS-164, in which n=an average of 3; this is available from Shell Chemical Company. Other suitable epoxy novolac resins are Epon 152 and Epon 154, also available from the Shell Chemical Company.

Other useful epoxy compounds, although not resins, are aliphatic in nature, particularly liquids of lower viscosity, that is epoxy compounds having a viscosity below 10 poise. Such epoxy compounds may be used as diluents. Suitable epoxy compounds are sold by Union Carbide, and are available under the trade names: "UVR-6200," which has an epoxy equivalent weight of approximately 120–130 and a Brookfield viscosity at 25° C. of 15 cps; "UVR-6100," which has an epoxy equivalent weight of about 130–140 and a Brookfield viscosity at 25° C. of 85–115; "UVR-6110," which has an epoxy equivalent weight of about 131–143 and a Brookfield viscosity at 25° C. of 350–450 cps.; and "UVR-6351," which has an epoxy equivalent weight of 455–465 and a Brookfield viscosity at 25° C. of 850 cps. Although the precise chemical structures are not disclosed by Union Carbide, and are maintained as a trade secret, these materials are believed to be based on epoxy cyclohexanes, linked by ester groups, structurally similar to a product known as "ECC" available from GAF. This ECC product represented by the following structure:

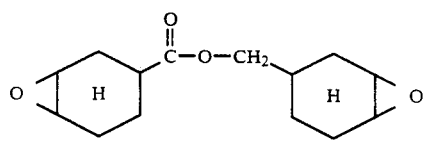

Any combination of epoxy resins or epoxy compounds may be used, as long as the resulting product is a liquid at temperatures preferably below 100° C.

Vinyl epoxy resins that are derived from a partial or complete reaction of the oxirane groups of an epoxy resin with a vinyl acid, including for example, vinyl benzoic acid and vinyl unsaturated monocarboxylic acids, such as acrylic or methacrylic acid, may also be used as a matrix polymer precursors.

Any other vinyl compounds, may be used as matrix polymer precursors, including for example, di-acrylate, poly-acrylate or methacrylate, these vinyl compounds may be used alone or in combination with monoacrylates, methacrylates, styrene, vinyl toluenes, chloromethylstyrenes, divinylbenzenes, acrylonitrile and substituted styrenes, such as a methylstyrene.

Combinations of unsaturated polyester resins and vinyl monomers may be used. The unsaturated polyester may be made from, for example, maleic anhydride, maleic acid, or fumaric acid, and diols having from one to twelve carbon atoms. Suitable vinyl monomers include, for example, styrene, substituted styrenes, such as methylstyrene and vinyl ethers.

In addition, di-allyls or poly-allyls may be used, as a precursor to the matrix polymer. A suitable di-allyl, "Matrimid 5292B," available from the Ciba Geigy Corp. may be used. Matrimid 5292B is represented by the following structure:

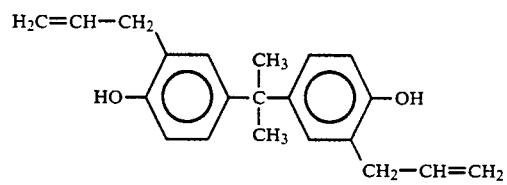

A di-allyl such as the Matrimid 5292B copolymerizes with maleimide compounds such as Matrimid 5292A, a bis-maleimide compound also available from Ciba Geigy Corp, represented by the structure below:

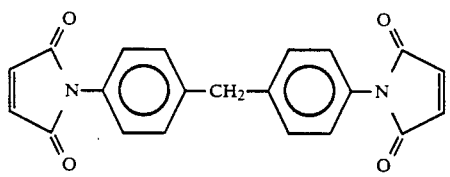

Also, liquid or low melting point acetylene terminated matrix such as a dipropargyl ether of bisphenol A may be used. A dipropargyl ether of bisphenol A is represented by the following structure:

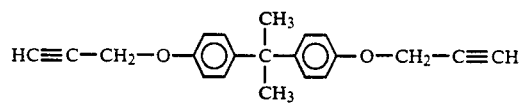

The bis-acetylenes cure either by themselves at elevated temperatures, that is, at temperatures above 250° C. or they cure at lower temperatures in combination with bis-maleimides.

Matrix Polymer Precursors suitable for Polyazomethine Precursors

In addition to the Epoxy Resins, vinylacrylate and vinyl methacrylate modified epoxy resins, whether partially or completely vinylated, are suitable matrix polymer precursors for polyazomethines precursors. Also suitable are unsaturated polyester and vinyl monomer combinations and the mixtures of vinyl monomers.

Matrix Precursors suitable for Polyimide Precursors

Preferably, matrix precursors for polyimide precursors should be solvents for polyimide precursors and should be unreactive towards the polyimide precursor, as well as polyamic acid intermediates, at ambient or moderately elevated temperatures, that is up to approximately 150° C. Suitable matrix precursors are unsaturated polyester/vinyl monomer combinations (vinyls, styrene, substituted styrene, vinyl-alkyl, acetylene terminated phenols, bisphenols, etc.), alkyl substituted bisphenol types, for example Matrimid 5292B, dipropargylethers of bisphenols, acrylate or methacrylate derivatives of bisphenols, or reaction products of epoxy resins with acrylic or methacrylic acid, if "Michael" type additions to the acrylate double bond can be avoided. The same restrictions should also apply to unsaturated polyesters and maleimides.

Matrix Precursors suitable for Polycarbodiimide Precursors

Preferably, matrix precursors should be solvents for polycarbodiimide precursors, such as, for example, diisocyanates, and should be unreactive towards the polycarbodiimide precursors, as well as any intermediates at ambient or moderately elevated temperatures, for example up to about 150° C. Thus, the matrix precursors must be dry and contain virtually no groups reactive with isocyanates, such as primary or secondary amines, alcohols, phenols or mercaptans. Thus, most of the matrix precursors, discussed above, may be suitable, including epoxy compounds with no or very few hydroxyl groups. Low concentrations of hydroxy-terminated or partially hydroxy-terminated polyesters may not be detrimental, since they may give rise to polyester-polycarbodiimide block polymers, which could enhance the dispersability of rigid rod polymers in the matrix and enhance compatibility with the matrix.

Curing Agents

Curing agents are used to convert the noncrosslinked thermosetting resin, that is the matrix polymer precursors, into a cross-linked network. The curing or polymerization of vinyl-type matrix precursors, such as acrylates, methacrylates, vinylesters, styrene and unsaturated polyester systems is usually accomplished by heating the matrix polymer precursors to 100° C. to 200° C. in presence of free-radical initiators, preferably organic peroxides. For epoxy matrix precursors, basically all conventional epoxy curing agents may be used, such as anhydrides, carboxylic acids, primary and/or secondary amino compounds, mercaptanes and phenolic compounds. For an epoxy based composite having good high temperature performance, at 200° C. or higher, aromatic dianhydrides are preferred, such as: pyromellitic dianhydride (PMDA); 3,3',4,4'-benzophenone teteracarboxylic dianhydride (BTDA); 1,4,5,6-naphthalene tetracarboxylic dianhydride or its isomer 2,3,6,7-napthalene tetracarboxylic dianhydride; substituted PMDA, such as: monophenyl PMDA; diephenyl PMDA; dichloro PMDA; difluoro PMDA; bis(trifluoromethyl)-PMDA; substituted 3,3',4,4'-benzophenone teteracarboxylic dianhydride; substituted naphthaline dianhydrides, such as those listed above and 3,4,4',5'-biphenyltetracarboxylic dianhydride. 3,3',4,4'-benzophenone teteracarboxylic dianhydride, BTDA has the following structure:

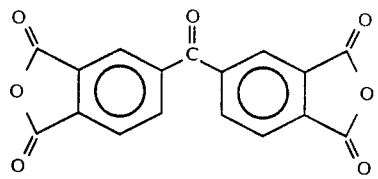

1,4,5,6-naphthalene tetracarboxylicdianhydride, is shown as structure A, and its isomer, 2,3,6,7-napthalene tetracarboxylicdianhydride is shown as structure B:

A:

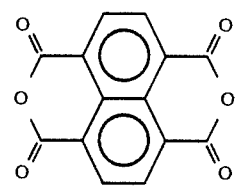

B:

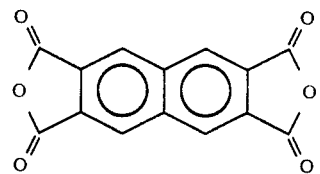

3,4,3',4'-biphenyltetracarboxylic dianhydride has the following structure:

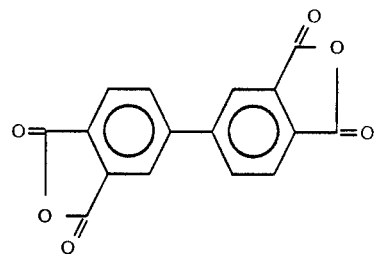

Primary and secondary aromatic diamines or polyamines are also suitable curing agents. Typical examples are: p-phenylenediamine; m-phenylenediamine; alkylated phenylene diamines; naphthaline diamines; benzidine; substituted such as o-toludine, 3,3' dihydroxybenzidine o-toludine-sulfone, 2,2'-dimethyl-benzidine, 4,4'-methylenedianiline, 4,4'-isopropylenedianiline, 4,4'-methylenebis-2-chloroaniline,4,4'-diaminobenzanilide, isobutyl-4-chloro-3,5-diaminobenzoate, trimethyleneglycol-(di-p-aminobenzoate), which is available under the trade name "Polacure 740M," from Air Products; polytetramethylene oxide-di(p-aminobenzoate), which is available under the trade names Polamine 650 and Polamine 1000, from Air Products; 4,4'-diaminodiphenylsulfone, "DDS"; and 4,4'- methylene-(N,N'-dibutyl) aniline under the trade name "UNILINK 4200" available from UOP, in Des Plaines, Ill. The preferred curing agents are diaminodiphenylene sulfone "DDS" and pyromellitic dianhydride, "PMDA," the more preferred being the pyromellitic dianhydride.

Less preferred curing agents are the aromatic monoanhydrides, such as: phthalic anhydride; cycloalophatic monoanhydrides; cycloalophatic dianhydrides; aliphatic monoanhydrides; aliphatic dianahydrides; cycloaliphatic monoamines; cycloaliphatic diamines, cycloaliphatic polyamines; aliphatic mono-amines; aliphatic diamines; aliphatic polyamines, available under the trade name "Jeffamines" from Texaco Chemical Company; dimercaptans; and polymercaptans. The aliphatic amines and mercaptans are less preferred.

The curing agents may be used alone or in combination. Typically from about 5% to about 50% by weight of curing agent is added. However, no curing agent is needed to make composites of polyazomethine and matrix polymers of cured epoxy resin, such as Epon 828.

Catalysts and Accelerators

Suitable catalysts and accelerators for the cure of epoxy resins are well known in the epoxy resin curing art and literature. Typical examples include: tertiary amines, such as dimethylbenzylamine, "DMBA"; imidazoles, such as 2-ethyl-4-methylimidazole, dicyanamide "DICY"; alkylphenols, Lewis acidamine complexes, such as $BF_3$ ethylamine; the catalysts and/or accelerators may be used alone or in combination in the present invention. Accelerators for the cure of vinyl resins used in combination with peroxide-type catalysts are also known in the art.

Fiber Reinforcement, Fillers and Additives

Glass fiber reinforcement may be used to further strengthen and toughen the resulting composite. The sizing on a glass fiber should be suited for epoxy resins. Fibers may be chopped or continuous filament, prepregs, mats, woven or non-woven, unidirectional or multi-directional. Reinforcement by dispersed chopped fibers is generally not preferred; this is due to the problems they create in processing. Other fibers may also be used, alone or in combination with glass fibers, such as organic polymer fibers of high modulus, that is, having a breaking tenacity greater than about 280 GPa, such as "Kevlar," which is the trade name given to a poly(p-phenylene) terephthalamide sold by DuPont, carbon fibers and ceramic fibers. Particular fillers may also be used to further stiffen and lower the cost of the composites. Suitable particulate fillers include: talc, milled, glass, silicates, aluminum oxides, calcium carbonate, mica, wollastonite, carbon black, and graphite. Metal powders, for example, aluminum, zinc, nickel and iron may be added to increase electrical and thermal conductivity and/or reduce static electrical charges.

In addition, other optional ingredients such as colorants, oderants, and fungicides may be a added.

Preparation of the Composite

Equipment

Most of the reactions were conducted in an approximately 1.5 liter cylindrical metal reactor, equipped with a steel stirrer either of the anchor or helix shape. The steel shaft of the stirrer is connected to a high torque, one quarter horse power electric motor, guided by a teflon ® sleeve, which sits in the center neck of a 3-neck resin kettle top (glass), with a gas inlet and outlet for dry $N_2$. The bottom tip of the stirrer closes the reactor outlet during reaction. The apparatus is vacuum tight. Material additions can be made through one of the necks in the resin kettle top. The reactor is heated through an electrical heating mantle with a temperature control. The temperature of the reaction mixture is measured via a thermocouple in the reactor bottom. The reaction product is retrieved by removing the reactor top and stirrer, then opening a bottom valve and pushing the material out of the reactor via a metal disk plunger. Depending on the example, the material was discharged into a closed sheet mold or into other containers, for example steel cans, for subsequent thermal cure. Preferably, the entire operation should be conducted in a modular, co-rotating twin screw extruder, for example, of the Werner Pfleiderer, ZSK type.

Reaction conditions

In the case of pPDA/TPA reactions in liquid epoxy resins, it is preferred to first dissolve the TPA in the epoxy resin at 50°-70° C. Then the powdered p-PDA is added slowly, over a period of about 5 to 60 minutes at about 50°-65° C., while agitating the mixture. As the diamine dissolves, it reacts instantly with the dialdehyde, which is indicated by a color change from a faint yellow to a deep red; the reaction is also indicated by the formation of condensation water. Alternatively, the diamine may be pre-dissolved in epoxy resin matrix polymer precursors and the dialdehyde may be added in powdered form, or both precursors may be pre-dissolved and blended as solutions. The condensation water may be removed by a vacuum or by azeotropic distillation, for example with toluene. The amount of condensation water removed may be used to monitor the extent of the monomer conversion to PAM. Depending on the rigid rod polymer precursor charge level, the molar charge ratio, and the reaction conditions, particularly temperature, either a transparent red liquid or an orange, opaque, paint-like liquid, dispersion of PAM may be obtained. Higher PAM concentrations, that is, greater than 15 weight %, lower reaction temperatures, that is below 60° C. and molar ratios of p-PDA to TPA of approximately one, tend to result in a paint-like appearance. The paint-like liquids seem to be extremely stable both mechanically and thermally. For example, they are stable for several days at approximately 150° C. in an uncured state. Lower monomer concentrations, for example, less than 10 weight %, higher molar ratios, where the ratio of p-PDA to TPA is greater than 1.05, and higher reaction temperatures, that is higher than 60° C., usually produce transparent dispersions of PAM.

Reaction rates are initially very fast, but will slow down considerably as the monomer is converted to PAM. The time to complete the conversion to PAM will depend on reaction conditions, particularly the effectiveness of the condensation water removal. Typically the conversion reactions are nearly complete after 1 to 2 hours under a vacuum of 22-25 inches.

Thereafter, the curing agents are blended with the PAM/epoxy dispersions at 100°-150° C. These higher temperatures are needed due to the low solubility and high melting temperature of the anhydrides. However, caution is required not to set-up the mixtures prematurely. Curing usually occurs from about 150° to about 200° C. Still higher temperatures may be used for post-cure; typically these temperatures may be up to 250° C. Care must be taken not to overheat samples, especially samples in which the thickness is greater than one half inch because of the high initial exothermic reaction and the poor heat transfer and dissipation. Thus, slow and gradual heating is generally preferred. Total cure cycles may range from 2-24 hours, more typically 3-8 hours.

Accelerators or catalysts are usually not required for compositions containing PAM, since PAM seems to autocatalyze and aid curing. Basically, PAM/epoxy compositions may be cured without curing agents, especially in compositions having levels of PAM greater than 10 weight percent, and/or in compositions having a charge ratio of diamine to dialdehyde that is greater than 1 to 1. Differential scanning calorimetry scans reveal that exothermic cures occur, when a composition has at least approximately 10% PAM, at temperatures greater than 100° C.; the slower the heating rate, the lower the onset and peak of cure. Catalysts or accelerators may be used to accelerate the cure and/or lower the cure temperatures.

We were unable to cure control samples of Epon 828 with Nadic (methyl) anhydride in the absence of catalysts at 172°-245° C. in 4 hours. Another control, of Epon 828 and micro-fine PMDA, solidified after approximately 2 hours at approximately 200° C. However the sample was not homogeneous and consisted of a clear top layer and a bottom layer containing substantial undissolved, unreacted PMDA. Thus, PAM seems to aid the dispersion of PMDA and its reaction with the epoxy resin.

Liquid anhydride curing agents, such as nadic(methyl)anhydride, "NMA," mix readily with PAM /epoxy resin dispersions and advantageously reduced viscosity. However, the high temperature resistant properties of the composite suffer; this is due to the liquid anhydride's lowering of the glass transition temperature of the composite. As expected, PAM has a positive effect on Tg.; the control, which was comprised of 80 parts NMA to 100 parts Epom 828, had a Tg of 127° C., whereas a sample having 12% PAM, had a Tg of 150 to 206° C., depending on cure time.

The following examples illustrate the invention, and are not intended to limit the invention in any way.

EXAMPLES

Example 1

PAM/Epoxy 20/80 composite cured with PMDA

First, 420 grams of Epon 828, approximately 2.23 equivalents epoxy, were charged to the reactor, together with 66 grams or approximately 0.49 moles of terephthalaldehyde, "TPA," 98% from Aldrich. The mixture was stirred and heated to approximately 50° C. under a nitrogen atmosphere. A clear, nearly colorless liquid was obtained. Then 54 grams or approximately 0.50 moles, of p-phenylenediamine "p-PDA," 99.5% min. from DuPont, in powder form, was spooned in over a period of approximately 15 minutes. A deep red transparent liquid was produced at the end of the addition. Condensation water was observed on the walls of the resin kettle top. Slowly, the clear liquid converted to a thick orange paint-like consistency, but was well stirable. To reduce the viscosity, the mixture was heated to 68° C. and an oil pump vacuum was applied to remove the condensation water. After about one hour, the vacuum was replaced by nitrogen. Then 140 grams of pyromellitic dianhydride, "PMDA" from Allco Chemical Corp., having approximately 1.3 equivalents anhydride, in micro-fine powder form, was added with good agitation over a period of approximately 20 minutes. A very viscous, chocolate brown liquid was obtained. The material was discharged via an air pressured plunger through a heated connecting pipe directly into a sheet mold, which was heated to approximately 120°-140° C. To assure complete mold filling, the mold was slanted with an outlet at the highest point. Some material was allowed to flow out of the outlet, which was then closed under pressure from the plunger. A valve between the mold in-take and the feeding pipe was also closed and the feeding pipe disconnected. The closed mold was placed in a heated press at approximately 150° C. under pressure of approximately 2,000 pounds or approximately 25 PSI. The mold is sealed by a neoprene gasket to allow compression during the cure. The curing was done by gradually heating the press from 150° C. to about 250° C. over a period of approximately 4 hours. The mold was allowed to cool to room temperature in the press under pressure. A very hard and stiff sheet of cured material was obtained and evaluated.

The mechanical properties for Example 1 are shown in Table 1 below.

Example 2

The same procedures were followed as in Example 1, except 38 g. of diamine, 46g. of terephthalaldehyde, 400 grams of Epon 828 and 141 grams of PMDA were added to provide a ratio of 12/65/23 of PAM-/Epon/PMDA. The mechanical properties are shown in Table 1 below.

Example 3

The same procedures were followed as in Example 1, except 23.5 g. of diamine, 28.5g. of terephthalaldehyde, 400 grams of Epon 828 and 141 grams of PMDA were added to provide a ratio of 8/68/24 of PAM-/Epon/PMDA. The mechanical properties are shown in Table 1 below.

Example 4

The same procedures were followed as in Example 1 except 18 g. of diamine, 21.4g. of terephthalaldehyde, 400 grams of Epon 828 and 140 grams of PMDA were added to provide a ratio of 6/70/24 of PAM-/Epon/PMDA. The mechanical properties are shown in Table I below.

TABLE I

| Example Number | PAM/Epon/PMDA | FLEXURAL PROPERTIES | |
| --- | --- | --- | --- |
| | | Modulus (MSI) | Maximum Stress (KSI) |
| 1 | 15/63/22 | 0.5 | 11.7 |
| 2 | 12/65/23 | 0.5 | 8.1 |
| 3 | 8/68/24 | 0.5 | 6.8 |
| 4 | 6/70/24 | 0.48 | 7.2 |

DMTA Scans using a Polymer Labs Dynamic Mechanical Analyzer (DMTA) are shown for Examples 1, 2 and 3 in FIG. 1. It can be seen that Example 1 has the flattest storage modulus (E') versus temperature cure of the three Examples; this means that Example 1 has the best high temperature modulus. Example 1 also has the higher maximum stress; thus Example 1, is the most preferred. Example 2, which has the next highest maximum stress is the next preferred Example. Not shown in FIG. 1, is that the tan delta peak, when used as a measure of the glass transition temperature, shifts to higher temperatures with an increase in the amount of rigid rod polymer. This is expected in a composite having a molecular dispersion of a rigid rod polymer within a matrix polymer.

Example 5

PAM/epoxy (5/95) composite, cured with DDS:

The same reaction conditions were followed as in Example 1, except the anchor type stirrer was replaced by a helix shaped mixer. First 500 grams of Epon 828 having approximately 2.65 equivalent epoxy and 23 grams or approximately 0.172 moles of TPA were charged to the reactor and heated to 74° C. within approximately 20 minutes under $N_2$ atmosphere and agitation. To the clear, light yellow colored liquid, was added 19 grams, approximately 0.176 moles, of p-PDA over 3 minutes. Approximately 58 ml. of toluene were poured into the reactor to rinse off the material from the intake neck and stirrer. A transparent deep red liquid resulted, which was then heated to 87° C. Vacuum with a slight $N_2$ purge was applied to remove the toluene and condensation water for approximately 1 hour. The final temperature was 92° C. The vacuum was replaced by $N_2$. Then 150 grams of diaminodiphenylene sulfone, "DDS," 99% available from Palmer, Davis & Seika, Inc. (having a 1.2 equivalents of $NH_2$) was mixed in over a 7 minute period followed by vigorous agitation for a 10 minutes. The reaction mixture was degassed under vacuum for approximately 5 minutes and the red-orange liquid of relatively low viscosity was then discharged directly into a pre-heated sheet mold, which had been heated to approximately 120° C. The curing was done in a heated press at about 150°-220° C. for approximately 4 hours. A sample in a steel can cured to a hard solid in less than 2 hours at approximately 180°-185° C. The cured material in the can was a deep red but transparent solid. The sheet mold yielded a very dark red, but translucent material. The properties are shown in Table 2 along with a PAM-free control.

Example 6

Example 6 is a repeat of Example 5 except that it was run at a higher temperature. The monomer reaction to the PAM was conducted at 85°-95° C. During the removal of the condensation water under vacuum, the final temperature was approximately 110° C.

Example 6a

In the procedure of Example 6, about one-half of the sheet mold was filled with approximately 31 wt. % glass fiber, known as Kuytex Weft Unidirectional Fabric, available from Hexcel Corp. The properties of the glass reinforced sample are shown in Table III.

Example 7

The same procedures as described in Example 5 were followed, except that twice the PAM level, that is 10%, was used and the $NH_2/CO$ ratio was slightly increased to approximately 1.1. The cured material was translucent.

Example 8

The same procedures described in Example 5 were followed, except that the molar ratio of p-PDA/TPA was increased to approximately 1.2. Also, 50 grams of a molecular sieve having a pore size of 4 angstroms was used as a desiccant. No toluene was used to remove water. The cured material obtained was translucent.

Example 9

The same procedures were followed as in Example 5, except that vacuum was used to remove water; no toluene was used. The cured material was translucent.

Example PAM Free Control

The same procedures were followed as in Example 5, except that no PAM was added.

Example PAM Free Control with Glass

In the procedure of Example 9a, about one-half of the sheet mold was filled with approximately 31 wt. % glass fiber, known as Kuytex Weft Unidirectional Fabric, available from Hexcel Corp. The sample that was obtained was evaluated; the results are shown in Table III.

TABLE II

| Example Number | Composition: PAM/Epon/PMDA | Flexural Properties | | Tensile Properties | |
|---|---|---|---|---|---|
| | | Modulus (MSI) | Strength (KSI) | Modulus (MSI) | Strength (KSI) |
| 5 | 5/73/22 | 0.48 | 9.5 | 0.54 | 3.2 |
| 6 | 5/73/22 | 0.45 | 19.9 | 0.40 | 9.2 |
| 7 | 10/68/22 | 0.47 | 15.6 | — | — |
| 8 | 10/68/22 | 0.40 | 2.6 | 0.53 | 3.7 |
| 9 | 10/68/22 | 0.46 | 12.6 | 0.84 | 2.4 |
| Control | 0/75/25 | 0.34 | 10.3 | 0.38 | 7.2 |

Example 9, which has the highest tensile modulus, is the most preferred formulation of the PAM-epoxy composites cured with DDS.

TABLE III

| Example Number | Glass % | Composition PAM/Epon/DDS | Flexural | | Tensile | | Compression |
|---|---|---|---|---|---|---|---|
| | | | Modulus (MSI) | Strength (KSI) | Modulus (MSI) | Modulus (MSI) | Strength (KSI) |
| 6a | 31 | 5/73/22 | 2.6 | 81 | 3.0 | 48 | 52 |
| 6 | 0 | 5/73/22 | 0.45 | 20 | 0.4 | 9 | 20 |
| Control | 31 | 0/75/25 | 1.5 | 62 | 2.3 | 32 | — |
| Control | 0 | 0/75/25 | 0.34 | 10 | 0.38 | 7 | — |

Example 10

PAM/epoxy (20/80) composite, cured with NMA

As described in Example 1, 400 grams of Epon 828, having approximately 2.2 equivalents of epoxy, followed by 60 grams or 0.47 moles of TPA were added to the reactor; after heating the stirred mixture to 60° C., a clear liquid resulted. To the clear liquid, 52 grams or 0.48 moles of p-PDA were added over a 7 minute period at 54° C. A clear, deep red viscous liquid resulted, which slowly became turbid. The condensation water was removed by vacuum (with N2 sweep) for approximately 3 hours at 56°-68° C. To the resultant orange, paint-like liquid was added 320 grams of methyl-nadicanhydride (NMA) having a molecular weight of approximately 178, from the Buffalo Color Corp. The high viscosity of the PAM/epoxy mixture was considerably reduced by the NMA. Mold filling was done as described above. The cure process occurred in the hot press at 150°-250° C. A light orange, homogenous, very hard and stiff sheet was obtained, and evaluated. The material had a flexural modulus of 0.53 MSI, a flexural strength of 18.6 KSI, a Tg, as measured by DMTA, after cure of 132° C., and a Tg of 206° C. after an overnight post-cure at 180°-200° C.

Example 10a

Control

In a control experiment, 100 grams of Epon 828 were mixed with 80 grams of NMA. No cure was achieved while heating from 180° C. to 240° C. over a 5 hour period. This result was confirmed by DSC; there was no cure, while heating the sample from room temperature to 280° C. at the rate of 2.5° C. per minute. A second scan of the sample showed no exothermic heat of reaction when heated up to 440° C.

Example 11

Curing PAM/epoxy compositions without a curing agent or catalyst

A 20/80 PAM/Epon 828 mixture was produced in the reactor, as described in Example 1, and transferred into a preheated sheet mold. The mixture was cured in the press for approximately 3 hours at 175° C., then for approximately 15 hours at 195° C. A very hard, stiff, dark but translucent sheet was obtained. The mechanical properties are shown in Table IV.

TABLE IV

| Example Number | PAM/Epon 828 | Tensile Properties | | |
|---|---|---|---|---|
| | | Modulus (MSI) | Strength (KSI) | % Elongation |
| 11 | 20/80 | 0.9 | 10.0 | 1.68 |

Example 12

A sample having a 10/90 ratio of PAM/Epon 828 was prepared as in Example 1. Differential scanning calorimetry of a sample heated at 5° C./minute indicated a cure exotherm between approximately 230° C. and 360° C. with a maximum at approximately 300° C. (See FIG. 2).

While the invention has been described with a certain degree of particularity, various adaptations and modifications can be made without departing from the scope of the invention as defined in the appended claims.

What is claimed is:

1. A method for preparing a composite material comprising the steps of:
   a. dissolving precursors to a rigid rod polymer in precursors to a thermosetting matrix polymer;
   b. reacting the precursors to the rigid rod polymer to form the rigid rod polymer in situ; and
   c. reacting the precursors to the thermosetting matrix polymer to form the thermosetting matrix polymer in situ.

2. A method for preparing a composite material comprising the steps of:
   a. dissolving precursors to a rigid rod polymer in precursors to a matrix polymer;
   b. reacting the precursors to the rigid rod polymer selected from the group consisting essentially of: polyazomethines; polyimides; and polycarbodiimides; to form the rigid rod polymer in situ; and
   c. reacting the precursors to the matrix polymer to form the matrix polymer in situ.

3. A method for preparing a composite material comprising the steps of:
   a. dissolving precursors to a rigid rod polymer in precursors to a thermosetting matrix polymer;
   b. reacting the precursors to the rigid rod polymer to form the rigid rod polymer in situ; and
   c. reacting the precursors to the thermosetting matrix polymer to form the thermosetting matrix polymer in situ, wherein the rigid rod polymer is dispersed in the matrix polymer, and further wherein the reaction of the precursors to the rigid rod polymer is no later than the polymerization of the precursors to the matrix polymer.

4. The method of claim 1 wherein the rigid rod polymer is polyazomethine.

5. The method of claim 1, wherein the precursors to the rigid rod polymer are comprised of diamines and dialdehydes.

6. The method of claim 1, wherein the precursors to the rigid rod polymer are p-phenylenediamine and terephthalaldehyde.

7. The method of claim 1, wherein the precursors to the rigid rod polymer are p-phenylenediamine and terephthalaldehyde, and the precursors to the matrix polymer is epoxy resin.

8. The method of claim 1 wherein the rigid rod polymer is polyimide.

9. The method of claim 1, wherein the precursors to the rigid rod polymer comprised of pyromellitic dianhydride and p-phenylene diamine.

10. The method of claim 1 wherein the rigid rod polymer is polycarbodiimide.

11. The method of claim 1, wherein the precursors to the rigid rod polymer are comprised of diisocyanate.

12. The method of claim 1, wherein the precursors to the matrix polymer are comprised of epoxy resins.

13. The method of claim 1, wherein the precursors to the matrix polymer are comprised of epoxy resin having the following structure:

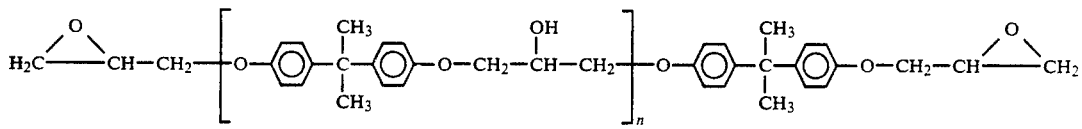

Wherein n=1 for about 15% by weight of the resin, and wherein n=0 for about 85% of the resin.

14. A composite material comprising: a matrix polymer; and a rigid rod polymer; wherein precursors to the rigid rod polymer have been dissolved in precursors to the matrix polymer and wherein the rigid rod precursors and the matrix polymer precursors are polymerized in situ.

15. The composite material of claim 14, wherein the rigid rod polymer is polyazomethine.

16. The method of claim 14, wherein the precursors to the rigid rod polymer are comprised of diamines and dialdehydes.

17. The composite material of claim 14, wherein the precursors to the rigid rod polymer are p-phenylenediamine and terephthalaldehyde.

18. The composite material of claim 14, wherein the precursors to the rigid rod polymer are p-phenylenediamine and terephthalaldehyde, and the precursors to the matrix polymer is epoxy resin.

19. The composite of claim 14 wherein the rigid rod polymer is polyimide.

20. The composite material of claim 14, wherein the precursor to the rigid rod polymer comprised of pyromellitic dianhydride and p-phenylene diamine.

21. The composite material of claim 14 wherein the rigid rod polymer is polycarbodiimide.

22. The composite material of claim 14, wherein the precursors to the rigid rod polymer are comprised of diisocyanate.

23. The composite material of claim 14, wherein the precursors to the matrix polymer are comprised of epoxy resins.

24. The composite material of claim 14, wherein the precursors to the matrix polymer are comprised of epoxy resin having the following structure:

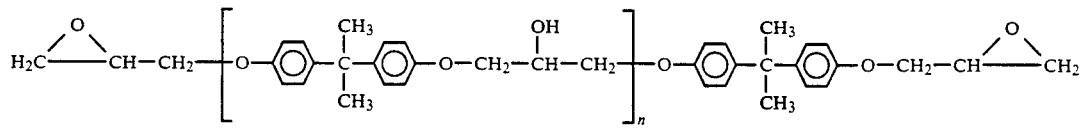

Wherein $n = 1$ for about 15% by weight of the resin, and wherein $n = 0$ for about 85% of the resin.